US010464588B1

(12) United States Patent
Lin (10) Patent No.: US 10,464,588 B1
(45) Date of Patent: Nov. 5, 2019

(54) FOLDABLE BABY STROLLER

(71) Applicant: NEW CENTURY PRODUCTS LIMITED, New Taipei (TW)

(72) Inventor: Fu-Tsun Lin, New Taipei (TW)

(73) Assignee: New Century Products Limited, New Taipei (TW)

( * ) Notice: Subject to any disclaimer, the term of this patent is extended or adjusted under 35 U.S.C. 154(b) by 0 days.

(21) Appl. No.: 16/238,112

(22) Filed: Jan. 2, 2019

(51) Int. Cl.
*B62B 7/08* (2006.01)
*B62B 9/26* (2006.01)
*B62B 9/20* (2006.01)

(52) U.S. Cl.
CPC .............. *B62B 7/08* (2013.01); *B62B 9/20* (2013.01); *B62B 9/26* (2013.01)

(58) Field of Classification Search
CPC .... B62B 3/02–3/027; B62B 3/00; B62B 5/06; B62B 3/001; B62B 3/002; B62B 7/08; B62B 9/20; B62B 9/26; B62B 5/064; B62B 2205/26; B65D 7/24; B65D 7/26; B65D 7/28
USPC ........................................................ 280/647
See application file for complete search history.

(56) References Cited

U.S. PATENT DOCUMENTS

| | | | | |
|---|---|---|---|---|
| 5,915,723 A * | 6/1999 | Austin | ............... | B62B 3/02 280/43 |
| 7,097,182 B1 * | 8/2006 | Liu | ............... | B62B 3/02 280/42 |
| 9,145,154 B1 * | 9/2015 | Horowitz | ............... | B62B 3/025 |
| 9,738,298 B1 * | 8/2017 | Yang | ............... | B62B 3/025 |
| 9,969,227 B1 * | 5/2018 | McNeave | ............... | B60F 3/0069 |
| 2008/0073880 A1 * | 3/2008 | Bess | ............... | B62B 3/02 280/651 |
| 2010/0156069 A1 * | 6/2010 | Chen | ............... | B62B 3/007 280/639 |
| 2011/0025005 A1 * | 2/2011 | Howell | ............... | B62B 3/007 280/47.24 |
| 2014/0353945 A1 * | 12/2014 | Young | ............... | B62B 3/02 280/650 |
| 2015/0035258 A1 * | 2/2015 | Chen | ............... | B62B 3/02 280/651 |
| 2016/0121943 A1 * | 5/2016 | Lamb | ............... | B62D 51/005 180/19.3 |
| 2016/0347338 A1 * | 12/2016 | Vargas, II | ............... | B62B 3/02 |

(Continued)

*Primary Examiner* — Paul N Dickson
*Assistant Examiner* — Hilary L Johns
(74) *Attorney, Agent, or Firm* — Muncy, Geissler, Olds & Lowe, P.C.

(57) ABSTRACT

A baby stroller is provided, which includes a front wheel assembly, rear wheel assembly and a folding assembly. The folding assembly includes two lateral folding holders; each includes an upper-front fence tube, lower-front fence tube, upper-back fence tube, lower-back fence tube and a middle holder. The middle holder includes an upper folding joint, lower folding joint and a support stand rod disposed therebetween. The front ends of the upper-front and lower-front fence tubes are pivotally connected to a front wheel holder respectively. The rear ends of the upper-front and lower-front fence tubes are pivotally connected to the front ends of the upper and lower folding joints. The rear ends of the upper-back and lower-back fence tubes are pivotally connected to the rear wheel holder respectively. The front ends of the upper-back and lower-back fence tubes are pivotally connected to the rear ends of the upper and lower folding joints.

10 Claims, 4 Drawing Sheets

(56) References Cited

U.S. PATENT DOCUMENTS

2017/0066463 A1* 3/2017 Wang ................. B62B 3/022
2017/0259838 A1* 9/2017 Choi .................. B62B 3/007
2017/0297598 A1* 10/2017 Delgatty ............. B62B 3/022

* cited by examiner

FOLDABLE BABY STROLLER

BACKGROUND OF THE INVENTION

1. Field of the Invention

The present invention relates to a stroller for babies or children, in particular to a foldable baby stroller which a baby or a child can stand on, sit on or lay in.

2. Description of the Prior Art

Baby strollers are usually designed for young babies. However, as the size of baby strollers is usually large, so most of baby strollers are designed to be foldable. However, most of baby strollers cannot be conveniently folded. Besides, the users of baby strollers are babies and children, and they should sleep in baby strollers; thus, the safety of these products is very important.

As described above, the currently available baby strollers still have a lot of shortcomings and need to be further improved.

The inventor of the present invention has kept trying hard to improve and innovate the currently available baby strollers according to the shortcomings of the currently available baby strollers. Finally, the inventor of the present invention successfully develops the foldable baby stroller of the present invention.

SUMMARY OF THE INVENTION

The object of the present invention is to provide a foldable baby stroller which a baby can stand on, sit on or lie in.

Another object of the present invention is to provide a foldable baby stroller capable of completely cover the whole body of a baby and the baby cannot reach out his/her hands and legs from the stroller.

Still another object of the present invention is to provide a foldable baby stroller; the foldable baby stroller has ingenious and reasonable design, and is able to be conveniently folded. Besides, the size of the foldable baby stroller in folded status is significantly reduced, so the stroller can be conveniently stored and carried. Further, the stability of the whole structure of the foldable baby stroller in unfolded status is great, so the stroller has high safety in use and excellent durability.

So as to realize the above objects, the most important consideration of the foldable baby stroller of the present invention is the structure stability. The present invention effectively improves the problem that the currently available baby strollers are of low structure stability via simpler structure design. The foldable baby stroller of the present invention mainly includes a front wheel assembly, a rear wheel assembly and a folding assembly.

More specifically, the front wheel assembly includes a front wheel holder, a front-left wheel and a front-right wheel disposed at the bottom of the front wheel holder. The rear wheel assembly includes a rear wheel holder, a rear-left wheel and a rear-right wheel disposed at the bottom of the rear wheel holder. The folding assembly includes two lateral folding holders disposed at the right side and the rear side thereof respectively. Each lateral folding holder includes an upper-front fence tube, a lower-front fence tube, an upper-back fence tube, a lower-back fence tube and a middle holder.

The upper-front fence tube and the upper-back fence tube are disposed in front of and adjacent to the lower-front fence tube and the lower-back fence tube respectively. The middle holder includes an upper folding joint, a lower folding joint and a support stand rod disposed therebetween and connecting the upper folding joint to the lower folding joint. The upper folding joint is disposed in front of and adjacent to the lower folding joint. The front ends of the upper-front fence tube and the lower-front fence tube are pivotally connected to the front wheel holder respectively. The rear ends of the upper-front fence tube and the lower-front fence tube are pivotally connected to the front ends of the upper folding joint and the lower folding joint corresponding thereto respectively. The rear ends of the upper-back fence tube and the lower-back fence tube are pivotally connected to the rear wheel holder respectively. The front ends of the upper-back fence tube and the lower-back fence tube are pivotally connected to rear ends of the upper folding joint and the lower folding joint corresponding thereto respectively.

Besides, the rear wheel holder is inverted U-shaped and connected to a push rod; the push rod extends from the rear side of the rear wheel holder.

In a preferred embodiment, the tops of the front wheel holder and the rear wheel holder are connected to inverted U-shaped frames respectively, and a folding-type flexible sunshade plate connects the inverted U-shaped frame of the front wheel holder to the inverted U-shaped frame of the rear wheel holder.

In a preferred embodiment, the middle portion of the support stand rod is connected to a front-side assistant support slope rod and a rear-side assistant support slope rod. The lower end of the front-side assistant support slope rod is pivotally connected to the front side of the middle portion of the support stand rod. The upper end of the front-side assistant support slope rod is pivotally connected to the rear end of the upper-front fence tube. The lower end of the rear-side assistant support slope rod is pivotally connected to the read side of the middle portion of the support stand rod, and the upper end of the rear-side assistant support slope rod is pivotally connected to the front end of the upper-back fence tube.

In a preferred embodiment, the middle portion of the support stand rod is connected to a joint fixation base. The front end and the read end of the joint fixation base extend to the front side and the rear side of the support stand rod. The lower ends of the front-side assistant support slope rod and the rear-side assistant support slope rod are pivotally connected to the front end and the rear end, corresponding thereto, of the joint fixation base respectively.

In a preferred embodiment, the cross-sectional view of the upper folding joint is inverted U-shaped and the bottom of the upper folding joint is provided with an upper-end positioning slot. The rear end of the upper-front fence tube and the front end of the upper-back fence tube extend into the front end and the rear end of the upper-end positioning slot respectively. The cross-sectional view of the lower folding joint is inverted U-shaped and the top of the lower folding joint is provided with a lower-end positioning slot. The rear end of the lower-front fence tube and the front end of the lower-back fence tube extend into the front end and the rear end of the lower-end positioning slot respectively.

In a preferred embodiment, the rear wheel holder is connected to a storage basket rod and a storage basket can be installed on or mounted on the storage basket rod. The storage basket rod protrudes from the rear side of the rear wheel holder and is disposed under the push rod.

In a preferred embodiment, a front connection rod connects the two sides of the lower-front fence tube to each other, and a rear connection rod connects the two sides of the lower-back fence tube to each other.

In a preferred embodiment, the front connection rod and the rear connection rod are straights rods disposed and extending from left to right.

In a preferred embodiment, the lower end of the inverted-U shaped sunshade frame is detachably installed at the tops of the front wheel holder and the rear wheel holder corresponding thereto.

In a preferred embodiment, the read end of the lower-front fence tube and the front end of the lower-back fence tube are metal magnetic-attraction ends and the lower-end positioning slot is provided with a magnet. The metal magnetic-attraction ends are detachably attracted to the front end and the rear end, corresponding thereto, of the magnet respectively.

Compared with the prior art, the present invention can provide obvious advantages and technical effects. More specifically, according to the above technical features of the foldable baby stroller, the structure design of the stroller is reasonable and ingenious. Besides, the size of the stroller can be significantly reduced after being folded, so can be conveniently stored, transported and carried. Moreover, the overall structure of the stroller is of high stability after being unfolded, which is of high safety in use and can achieve great durability. Furthermore, the structure design of the middle holder can further enhance the stability of the structure of the stroller and the smoothness of unfolding the stroller.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention; however it is not intended to limit the scope of the present invention.

Please refer to FIG. 1~FIG. 4, which illustrate the structure of the foldable baby stroller of the embodiments in accordance with the present invention. The foldable baby stroller of the present invention includes a front wheel assembly 10, a rear wheel assembly 20 and a folding assembly 30.

The front wheel assembly 10 includes a front wheel holder 11, a front-left wheel and a front-right wheel disposed at the bottom of the front wheel holder 11. The rear wheel assembly 20 includes a rear wheel holder 21, a rear-left wheel and a rear-right wheel disposed at the bottom of the rear wheel holder 21. The folding assembly 30 includes two lateral folding holders disposed at the right side and the rear side thereof respectively. Each lateral folding holder includes an upper-front fence tube 31, a lower-front fence tube 32, an upper-back fence tube 33, a lower-back fence tube 34 and a middle holder. The upper-front fence tube 31 and the upper-back fence tube 33 are disposed in front of and adjacent to the lower-front fence tube 32 and the lower-back fence tube 34 respectively. The middle holder includes an upper folding joint 35, a lower folding joint 36 and a support stand rod 37 disposed therebetween and connecting the upper folding joint 35 to the lower folding joint 36. The upper folding joint 35 is disposed in front of and adjacent to the lower folding joint 36. The front ends of the upper-front fence tube 31 and the lower-front fence tube 32 are pivotally connected to the front wheel holder 11 respectively. The rear ends of the upper-front fence 31 tube and the lower-front fence tube 32 are pivotally connected to the front ends of the upper folding joint 35 and the lower folding joint 36 corresponding thereto respectively. The rear ends of the upper-back fence tube 33 and the lower-back fence tube 34 are pivotally connected to the rear wheel holder 21 respectively. The front ends of the upper-back fence tube 33 and the lower-front fence tube 34 are pivotally connected to rear ends of the upper folding joint 35 and the lower folding joint 36 corresponding thereto respectively. A front connection rod connects the two sides of the lower-front fence tube 32 to each other. A rear connection rod connects the two sides of the lower-back fence tube 34 to each other. The front connection rod and the rear connection rod are straights rods disposed and extending from left to right.

The rear wheel holder 21 is inverted U-shaped and connected to a push rod 41; the push rod 41 extends from the rear side of the rear wheel holder 21. The rear wheel holder 21 is further connected to a storage basket rod 42; the storage basket rod 42 protrudes from the rear side of the rear wheel holder 21 and is disposed under the push rod 41.

The tops of the front wheel holder 11 and the rear wheel holder 21 are connected to inverted U-shaped frames 43 respectively, and a folding-type flexible sunshade plate connects the inverted U-shaped frames 43 of the front wheel holder and the rear wheel holder to each other. The lower end of the inverted-U shaped sunshade frame 43 is detachably installed at the tops of the front wheel holder 11 and the rear wheel holder 21 corresponding thereto.

The middle portion of the support stand rod 37 is connected to a front-side assistant support slope rod 381 and a rear-side assistant support slope rod 382. The lower end of the front-side assistant support slope rod 381 is pivotally connected to the front side of the middle portion of the support stand rod 37. The upper end of the front-side assistant support slope rod 381 is pivotally connected to the rear end of the upper-front fence tube 31. The lower end of the rear-side assistant support slope rod 382 is pivotally connected to the read side of the middle portion of the support stand rod 37, and the upper end of the rear-side assistant support slope rod 382 is pivotally connected to the front end of the upper-back fence tube 33.

The middle portion of the support stand rod 37 is connected to a joint fixation base 383. The front end and the read end of the joint fixation base 383 extend to the front side and the rear side of the support stand rod 37. The lower ends of the front-side assistant support slope rod 381 and the rear-side assistant support slope rod 382 are pivotally connected to the front end and the rear end, corresponding thereto, of the joint fixation base 383 respectively.

The cross-sectional view of the upper folding joint 35 is inverted U-shaped and the bottom of the upper folding joint 35 is provided with an upper-end positioning slot. The rear end of the upper-front fence tube 31 and the front end of the upper-back fence tube 33 extend into the front end and the rear end of the upper-end positioning slot respectively. The cross-sectional view of the lower folding joint 36 is inverted U-shaped and the top of the lower folding joint 36 is provided with a lower-end positioning slot. The rear end of the lower-front fence tube 32 and the front end of the lower-back fence tube 34 extend into the front end and the rear end of the lower-end positioning slot respectively. In addition, so as to enhance the stability of the foldable baby stroller in unfolded status, the read end of the lower-front fence tube 32 and the front end of the lower-back fence tube 34 are metal magnetic-attraction ends 391 and the lower-end positioning slot of the lower folding joint 36 is provided with a magnet 392. The metal magnetic-attraction ends 391 are detachably attracted to the front end and the rear end, corresponding thereto, of the magnet 392 respectively.

Moreover, the outer sides of the front wheel holder 11 and the rear wheel holder 21 are provided with hooks 44 for hanging some small items.

The design points of the present invention are that the foldable baby stroller has ingenious and reasonable design, and is able to be conveniently folded. Besides, the size of the foldable baby stroller in folded status is significantly reduced, so the stroller can be conveniently stored and carried. In addition, the stability of the whole structure of the foldable baby stroller in unfolded status is great, so the foldable baby stroller has high safety in use and excellent durability. Further, the structure design of the middle holder can further enhance the stability of the structure of the stroller and the smoothness of unfolding the stroller. Moreover, the designs of the storage basket rod and the hooks can further increase the functions of the stroller and improve the practicability thereof.

The above disclosure is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A foldable baby stroller, comprising:
    a front wheel assembly, comprising a front wheel holder, a front-left wheel and a front-right wheel disposed at the bottom of the front wheel holder;
    a rear wheel assembly, comprising a rear wheel holder, a rear-left wheel and a rear-right wheel disposed at the bottom of the rear wheel holder, wherein the rear wheel holder is inverted U-shaped, connected to a push rod and the push rod extends from a rear side of the rear wheel holder;
    a folding assembly, comprising two lateral folding holders disposed at a right side and a rear side thereof respectively, wherein each lateral folding holder comprises an upper-front fence tube, a lower-front fence tube, an upper-back fence tube, a lower-back fence tube and a middle holder; the upper-front fence tube and the upper-back fence tube are disposed in front of and adjacent to the lower-front fence tube and the lower-back fence tube respectively; the middle holder comprises an upper folding joint, a lower folding joint and a support stand rod disposed therebetween and connecting the upper folding joint to the lower folding joint; the upper folding joint is disposed in front of and adjacent to the lower folding joint; front ends of the upper-front fence tube and the lower-front fence tube are pivotally connected to the front wheel holder respectively, rear ends of the upper-front fence tube and the lower-front fence tube are pivotally connected to front ends of the upper folding joint and the lower folding joint corresponding thereto respectively, the rear ends of the upper-back fence tube and the lower-back fence tube are pivotally connected to the rear wheel holder respectively, and the front ends of the upper-back fence tube and the lower-back fence tube are pivotally connected to rear ends of the upper folding joint and the lower folding joint corresponding thereto respectively.

2. The foldable baby stroller of claim 1, wherein tops of the front wheel holder and the rear wheel holder are connected to inverted U-shaped frames respectively, and a folding-type flexible sunshade plate connects the inverted U-shaped frame of the front wheel holder to the inverted U-shaped frame of the rear wheel holder.

3. The foldable baby stroller of claim 1, wherein a middle portion of the support stand rod is connected to a front-side assistant support slope rod and a rear-side assistant support slope rod; a lower end of the front-side assistant support slope rod is pivotally connected to a front side of the middle portion of the support stand rod, an upper end of the front-side assistant support slope rod is pivotally connected to the rear end of the upper-front fence tube, a lower end of the rear-side assistant support slope rod is pivotally connected to a read side of the middle portion of the support stand rod and an upper end of the rear-side assistant support slope rod is pivotally connected to the front end of the upper-back fence tube.

4. The foldable baby stroller of claim 3, wherein the middle portion of the support stand rod is connected to a joint fixation base; a front end and a rear end of the joint fixation base extend to a front side and a rear side of the support stand rod; lower ends of the front-side assistant support slope rod and the rear-side assistant support slope rod are pivotally connected to the front end and the rear end, corresponding thereto, of the joint fixation base respectively.

5. The foldable baby stroller of claim 1, wherein a cross-sectional view of the upper folding joint is inverted U-shaped and a bottom of the upper folding joint is provided with an upper-end positioning slot; the rear end of the upper-front fence tube and the front end of the upper-back fence tube extend into a front end and a rear end of the upper-end positioning slot respectively; a cross-sectional view of the lower folding joint is inverted U-shaped and a top of the lower folding joint is provided with a lower-end positioning slot; the rear end of the lower-front fence tube and the front end of the lower-back fence tube extend into a front end and a rear end of the lower-end positioning slot respectively.

6. The foldable baby stroller of claim 1, wherein the rear wheel holder is connected to a storage basket rod; the storage basket rod protrudes from the rear side of the rear wheel holder and disposed under the push rod.

7. The foldable baby stroller of claim 1, wherein a front connection rod connects two sides of the lower-front fence tube to each other, and a rear connection rod connects two sides of the lower-back fence tube to each other.

8. The foldable baby stroller of claim 7, wherein the front connection rod and the rear connection rod are straight rods disposed and extending from left to right.

9. The foldable baby stroller of claim 2, wherein a lower end of the inverted-U shaped sunshade frame is detachably installed at tops of the front wheel holder and the rear wheel holder corresponding thereto.

10. The foldable baby stroller of claim 5, wherein the rear end of the lower-front fence tube and the front end of the lower-back fence tube are metal magnetic-attraction ends and the lower-end positioning slot is provided with a magnet; the metal magnetic-attraction ends are detachably attracted to a front end and a rear end, corresponding thereto, of the magnet respectively.

* * * * *

(12) EX PARTE REEXAMINATION CERTIFICATE (13066th)
United States Patent
Lin (10) Number: US 10,464,588 C1
(45) Certificate Issued: Oct. 22, 2025

(54) FOLDABLE BABY STROLLER

(71) Applicant: NEW CENTURY PRODUCTS LIMITED, New Taipei (TW)

(72) Inventor: Fu-Tsun Lin, New Taipei (TW)

(73) Assignee: New Century Products Co. Ltd.

Reexamination Request:
No. 90/019,498, Apr. 29, 2024

Reexamination Certificate for:
Patent No.: 10,464,588
Issued: Nov. 5, 2019
Appl. No.: 16/238,112
Filed: Jan. 2, 2019

(51) Int. Cl.
*B62B 7/08* (2006.01)
*B62B 9/20* (2006.01)
*B62B 9/26* (2006.01)

(52) U.S. Cl.
CPC .......... *B62B 7/08* (2013.01); *B62B 9/20* (2013.01); *B62B 9/26* (2013.01)

(58) Field of Classification Search
None
See application file for complete search history.

(56) References Cited

To view the complete listing of prior art documents cited during the proceeding for Reexamination Control Number 90/019,498, please refer to the USPTO's Patent Electronic System.

*Primary Examiner* — Sarah B McPartlin (57) ABSTRACT

A baby stroller is provided, which includes a front wheel assembly, rear wheel assembly and a folding assembly. The folding assembly includes two lateral folding holders; each includes an upper-front fence tube, lower-front fence tube, upper-back fence tube, lower-back fence tube and a middle holder. The middle holder includes an upper folding joint, lower folding joint and a support stand rod disposed therebetween. The front ends of the upper-front and lower-front fence tubes are pivotally connected to a front wheel holder respectively. The rear ends of the upper-front and lower-front fence tubes are pivotally connected to the front ends of the upper and lower folding joints. The rear ends of the upper-back and lower-back fence tubes are pivotally connected to the rear wheel holder respectively. The front ends of the upper-back and lower-back fence tubes are pivotally connected to the rear ends of the upper and lower folding joints.

AMENDED

FIG. 1

AMENDED

Figure 1:
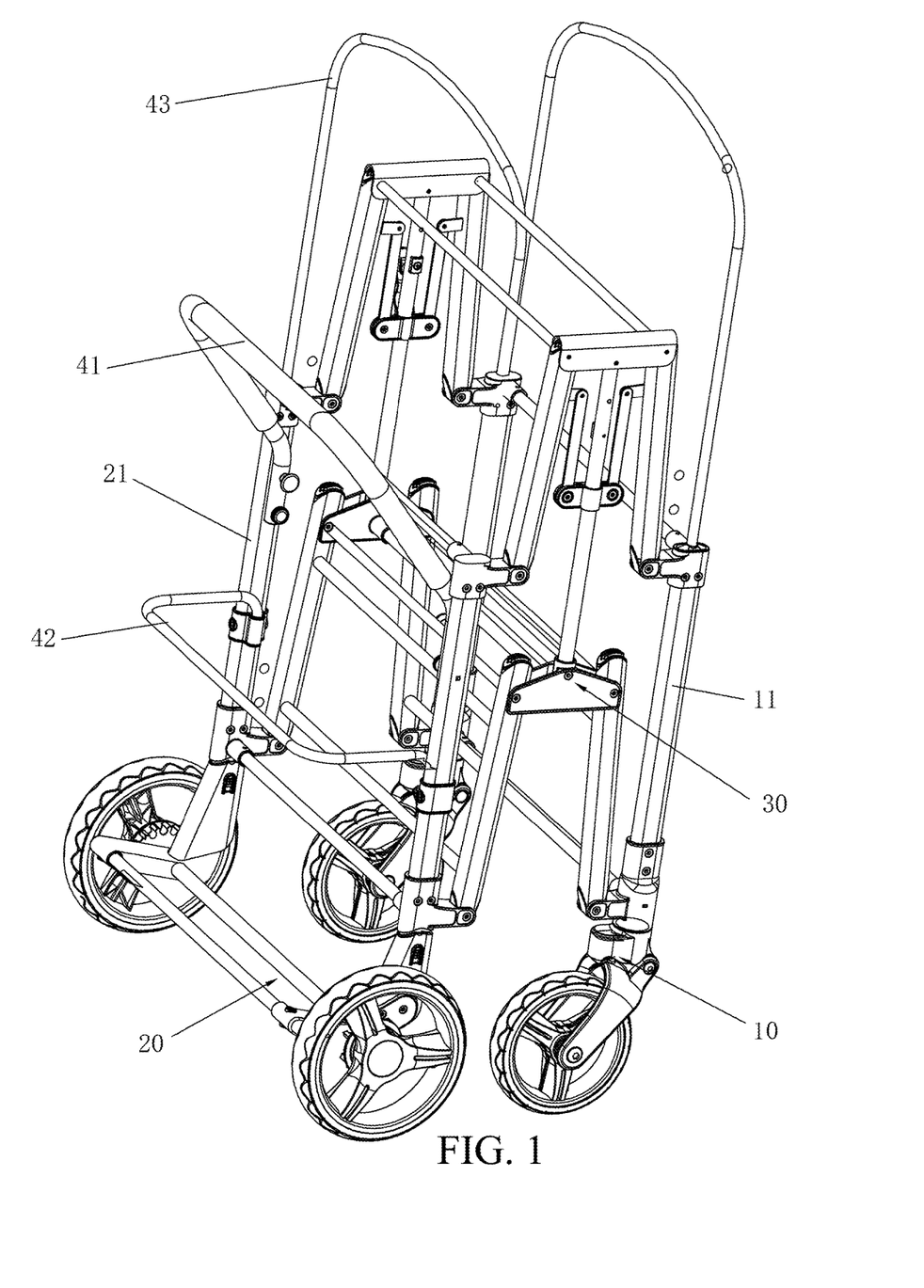
FIG. 1 is a perspective view of a foldable baby stroller in folded status of an embodiment in accordance with the present invention.
Figure 2:
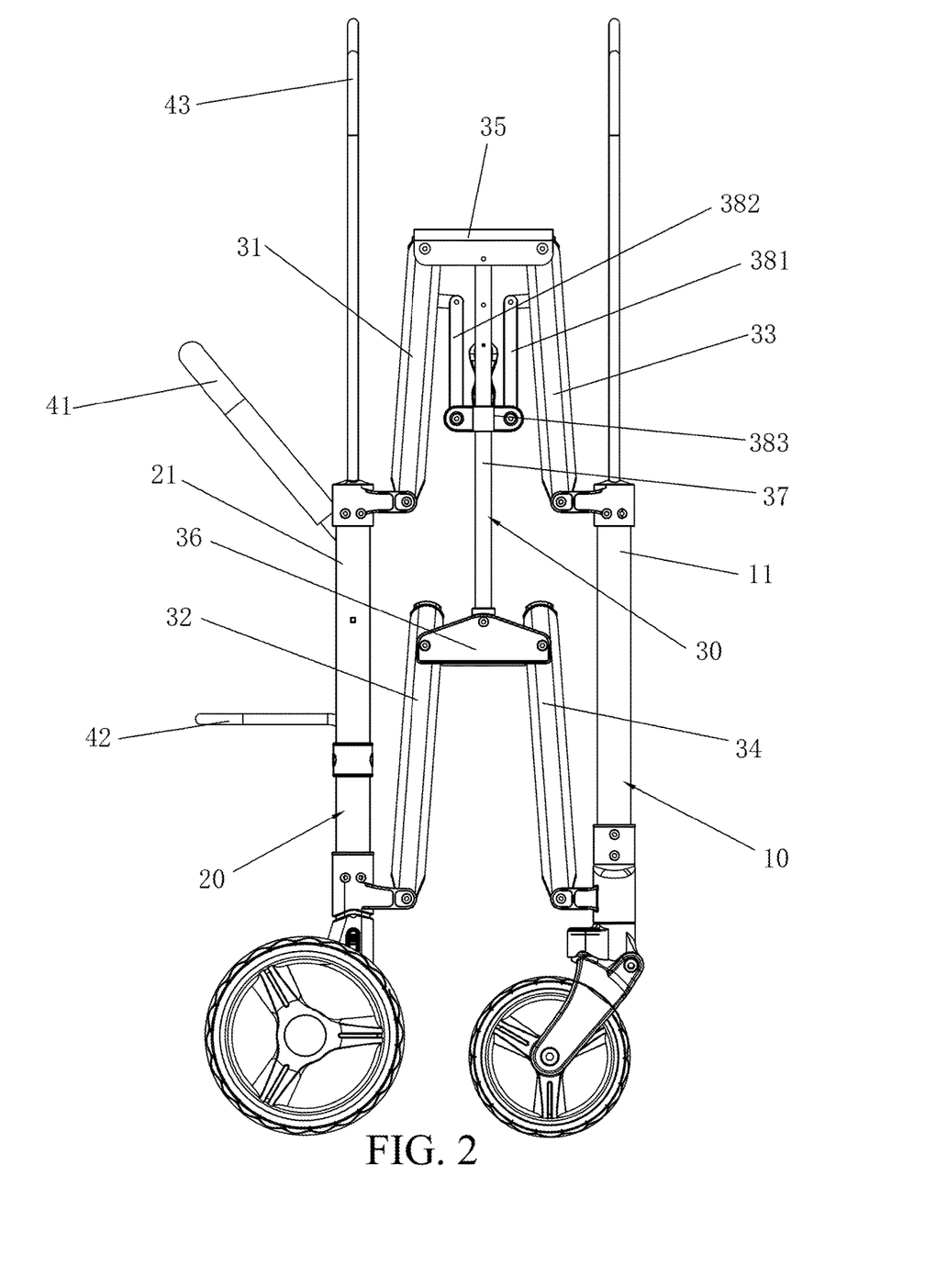
FIG. 2 is a lateral view of the foldable baby stroller in folded status of the embodiment in accordance with the present invention.

FIG. 2
Amended

Figure 3:
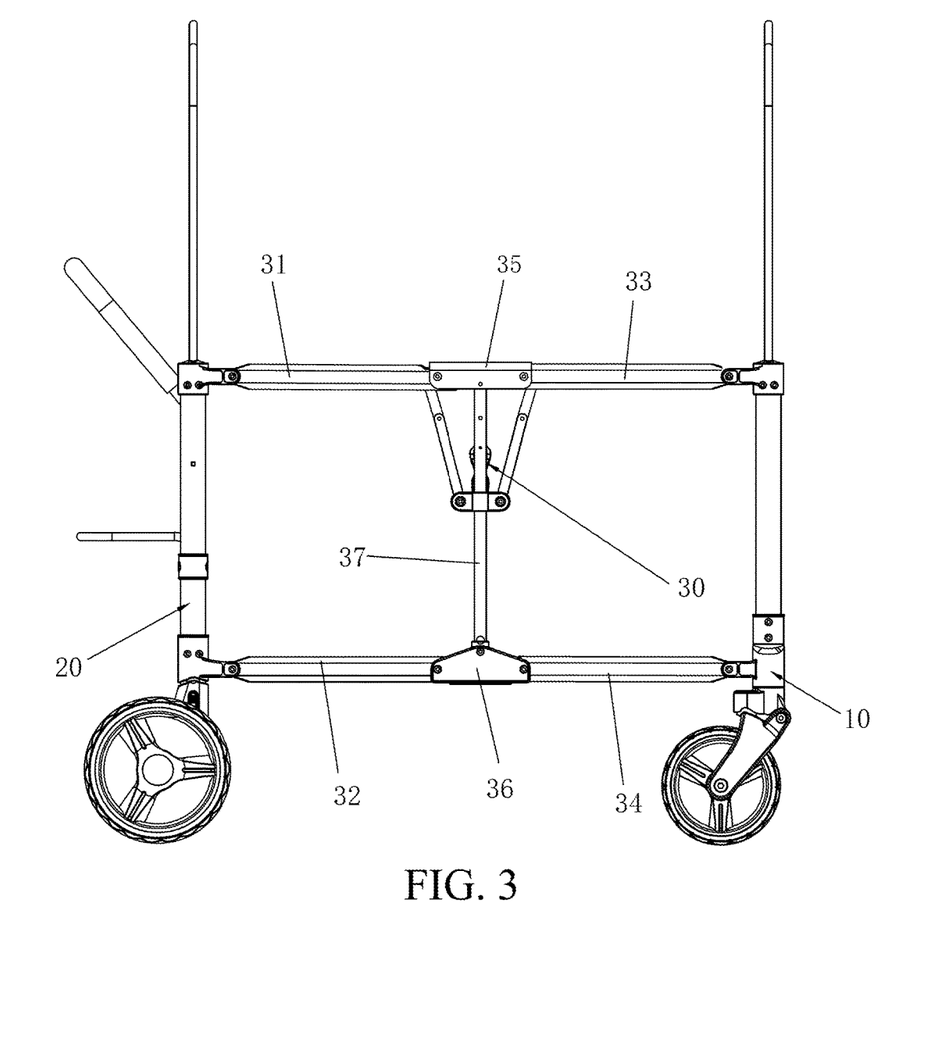
FIG. 3 is a lateral view of the foldable baby stroller in unfolded status of the embodiment in accordance with the present invention.
Figure 4:
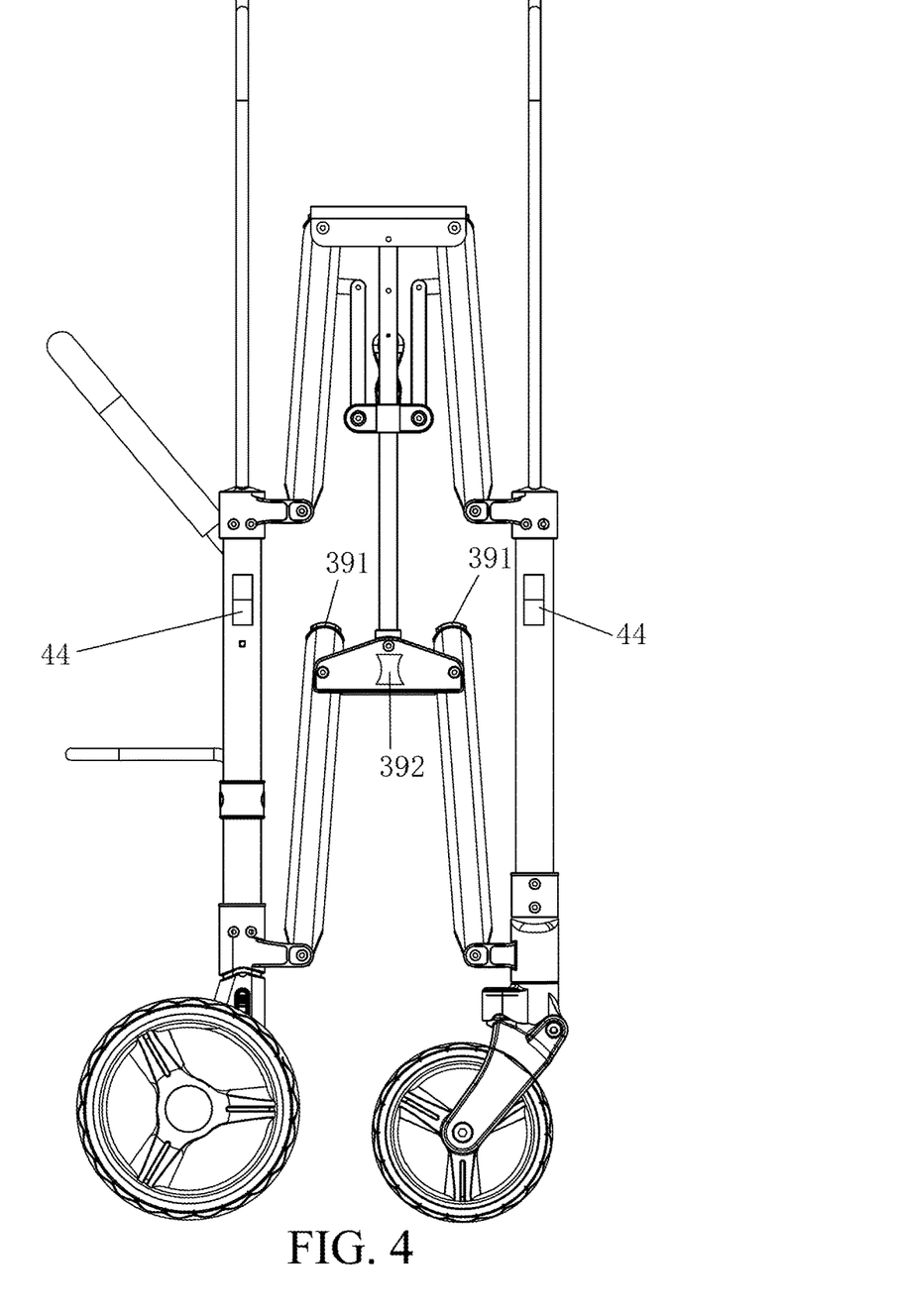
FIG. 4 is a lateral view of a foldable baby stroller in unfolded status of another embodiment in accordance with the present invention.

FIG. 3
Amended

US 10,464,588 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

FIG. 2 has been amended. Reference number "31" has been replaced with numeral—33—; reference number "33" has been replaced with number—31—; reference number "32" has been replaced with number—34—; and reference number "34" has been replaced with numeral—32—.

FIG. 3 has been ameded. Reference number "31" has been replaced with numeral—33—; reference number "33" has been replaced with number—31—; reference number "32" has been replaced with number—34—; and reference number "34" has been replaced with numeral—32—.

AS A RESULT OF REEXAMINATION, IT HAS BEEN DETERMINED THAT:

Claims 1, 3 and 6 are determined to be patentable as amended.

Claims 2, 4-5 and 7-10, dependent on an amended claim, are determined to be patentable.

New claims 11-20 are added and determined to be patentable.

1. A foldable baby stroller, comprising:
a front wheel assembly, comprising a front wheel holder, a front-left wheel and a front-right wheel disposed at the bottom of the front wheel holder;
a rear wheel assembly, comprising a rear wheel holder, a rear-left wheel and a rear-right wheel disposed at the bottom of the rear wheel holder, wherein the rear wheel holder is inverted U-shaped, connected to a push rod and the push rod extends from a rear side of the rear wheel holder;
a folding assembly, comprising two lateral folding holders disposed at a right side and a rear side thereof respectively, wherein each lateral folding holder comprises an upper-front fence tube, a lower-front fence tube, an upper-back fence tube, a lower-back fence tube and a middle holder; the upper-front fence tube and the upper-back fence tube are disposed in front of and adjacent to the lower-front fence tube and the lower-back fence tube respectively; the middle holder comprises an upper folding joint, a lower folding joint and a support stand rod disposed therebetween and connecting the upper folding joint to the lower folding joint; the upper folding joint is disposed in front of and adjacent to the lower folding joint; front ends of the upper-front fence tube and the lower-front fence tube are pivotally connected to the front wheel holder respectively, rear ends of the upper-front fence tube and the lower-front fence tube are pivotally connected to front ends of the upper folding joint and the lower folding joint corresponding thereto respectively, the rear ends of the upper-back fence tube and the lower-back fence tube are pivotally connected to the rear wheel holder respectively, and the front ends of the upper-back fence tube and the lower-back fence tube are pivotally connected to rear ends of the upper folding joint and the lower folding joint corresponding thereto respectively;
*wherein a cross-sectional view of the upper folding joint is inverted U-shaped and a bottom of the upper folding joint is provided with an upper-end positioning slot; and a cross-sectional view of the lower folding joint is U-shaped and a top of the lower folding joint is provided with a lower-end positioning slot;*
*wherein the lower-front fence tube and the lower-back fence tube are each pivotally connected at remote ends thereof to the front wheel holder and the rear wheel holder, respectively, and the lower-front fence tube and the lower-back fence tube are each pivotally connected at an intermediate point along their respective lengths to the lower folding joint providing contact between proximal ends of the lower-front fence tube and the lower-back fence tube and a base of the lower-end positioning slot.*

3. The foldable baby stroller of claim 1, wherein a middle portion of the support stand rod is connected to a front-side assistant support slope rod and a rear-side assistant support slope rod; a lower end of the front-side assistant support slope rod is pivotally connected to a front side of the middle portion of the support stand rod, an upper end of the front-side assistant support slope rod is pivotally connected to the rear end of the upper-front fence tube, a lower end of the rear-side assistant support slope rod is pivotally connected to a [read] *rear* side of the middle portion of the support stand rod and an upper end of the rear-side assistant support slope rod is pivotally connected to the front end of the upper-back fence tube.

6. The foldable baby stroller of claim 1, wherein the rear wheel holder is connected to a storage basket rod; the storage basket rod protrudes from the rear side of the rear wheel holder and *is* disposed under the push rod.

*11. A foldable baby stroller, comprising:*
*a front wheel assembly, comprising a front wheel holder, a front-left wheel and a front-right wheel disposed at the bottom of the front wheel holder;*
*a rear wheel assembly, comprising a rear wheel holder, a rear-left wheel and a rear-right wheel disposed at the bottom of the rear wheel holder, wherein the rear wheel holder is inverted U-shaped, connected to a push rod and the push rod extends from a rear side of the rear wheel holder;*
*a folding assembly, comprising two lateral folding holders disposed at a right side and a rear side thereof respectively, wherein each lateral folding holder comprises an upper-front fence tube, a lower-front fence tube, an upper-back fence tube, a lower-back fence tube and a middle holder; the upper-front fence tube and the upper-back fence tube are disposed in front of and adjacent to the lower-front fence tube and the lower-back fence tube respectively; the middle holder comprises an upper folding joint, a lower folding joint and a support stand rod disposed therebetween and connecting the upper folding joint to the lower folding joint; the upper folding joint is disposed in front of and adjacent to the lower folding joint; front ends of the upper-front fence tube and the lower-front fence tube are pivotally connected to the front wheel holder respectively, the upper-front fence tube and the lower-front fence tube are pivotally connected to front ends of the upper folding joint and the lower folding joint corresponding thereto respectively, the rear ends of the upper-back fence tube and the lower-back fence tube* are pivotally connected to the rear wheel holder respectively, and the upper-back fence tube and the lower-back fence tube are pivotally connected to rear ends of the upper folding joint and the lower folding joint corresponding thereto respectively;

wherein a cross-sectional view of the upper folding joint is inverted U-shaped and a bottom of the upper folding joint is provided with an upper-end positioning slot and a cross-sectional view of the lower folding joint is U-shaped and a top of the lower folding joint is provided with a lower-end positioning slot;

wherein the middle holder further comprises a horizontal fixation base having a first end and a second end, a first support slope rod connected to the first end of the horizontal fixation base, and a second support slope rod connected to the second end of the horizontal fixation base.

12. The foldable baby stroller of claim 11, wherein tops of the front wheel holder and the rear wheel holder are connected to inverted U-shaped frames respectively, and a folding-type flexible sunshade plate connects the inverted U-shaped frame of the front wheel holder to the inverted U-shaped frame of the rear wheel holder.

13. The foldable baby stroller of claim 11, wherein the horizontal fixation base is attached to the support stand rod, the first support slope rod is connected to the upper-front fence tube and the second support slope rod is connected to the upper-back fence tube.

14. The foldable baby stroller of claim 11, wherein the rear wheel holder is connected to a storage basket rod; the storage basket rod protrudes from the rear side of the rear wheel holder and is disposed under the push rod.

15. The foldable baby stroller of claim 11, wherein a front connection rod connects two sides of the lower-front fence tube to each other, and a rear connection rod connects two sides of the lower-back fence tube to each other.

16. A foldable baby stroller, comprising:
a front wheel assembly, comprising a front wheel holder, a front-left wheel and a front-right wheel disposed at the bottom of the front wheel holder;
a rear wheel assembly, comprising a rear wheel holder, a rear-left wheel and a rear-right wheel disposed at the bottom of the rear wheel holder, wherein the rear wheel holder is connected to a push rod extending from the rear wheel holder;
a folding assembly, comprising two lateral folding holders disposed at a right side and a rear side thereof respectively, wherein each lateral folding holder comprises an upper-front fence tube, a lower-front fence tube, an upper-back fence tube, a lower-back fence tube and a middle holder; the upper-front fence tube and the upper-back fence tube are disposed in front of and adjacent to the lower-front fence tube and the lower-back fence tube respectively; the middle holder comprises an upper folding joint, a lower folding joint and a support stand rod disposed there between and connecting the upper folding joint to the lower folding joint; the upper folding joint is disposed in front of and adjacent to the lower folding joint; front ends of the upper-front fence tube and the lower-front fence tube are pivotally connected to the front wheel holder respectively, rear ends of the upper-front fence tube and the lower-front fence tube are pivotally connected to front ends of the upper folding joint and the lower folding joint corresponding thereto respectively, the rear ends of the upper-back fence tube and the lower-back fence tube are pivotally connected to the rear wheel holder respectively, and the front ends of the upper-back fence tube and the lower-back fence tube are pivotally connected to rear ends of the upper folding joint and the lower folding joint corresponding thereto respectively;

wherein a cross-sectional view of the upper folding joint is inverted U-shaped and a bottom of the upper folding joint is provided with an upper-end positioning slot; and a cross-sectional view of the lower folding joint is U-shaped and a top of the lower folding joint is provided with a lower-end positioning slot;

wherein the lower-front fence tube and the lower-back fence tube are each pivotally connected at remote ends thereof to the front wheel holder and the rear wheel holder, respectively, and the lower-front fence tube and the lower-back fence tube are each pivotally connected at non-end points within an intermediate region of their respective lengths to the lower folding joint providing contact between proximal ends of the lower-front fence tube and the lower-back fence tube and a base of the lower-end positioning slot.

17. The foldable baby stroller of claim 16, wherein tops of the front wheel holder and the rear wheel holder are connected to inverted U-shaped frames respectively, and a folding-type flexible sunshade plate connects the inverted U-shaped frame of the front wheel holder to the inverted U-shaped frame of the rear wheel holder.

18. The foldable baby stroller of claim 16, wherein a middle portion of the support stand rod is connected to a front-side assistant support slope rod and a rear-side assistant support slope rod; a lower end of the front-side tant support slope rod is pivotally connected to a front side of the middle portion of the support stand rod, an upper end of the front-side assistant support slope rod is pivotally connected to the rear end of the upper-front fence tube, a lower end of the rear-side assistant support slope rod is pivotally connected to a rear side of the middle portion of the support stand rod and an upper end of the rear-side assistant support slope rod is pivotally connected to the front end of the upper-back fence tube.

19. The foldable baby stroller of claim 18, wherein the middle portion of the support stand rod is connected to a joint fixation base: a front end and a rear end of the joint fixation base extend to a front side and a rear side of the support stand rod; lower ends of the front-side assistant support slope rod and the rear-side sistant support slope rod are pivotally connected to the front end and the rear end, corresponding thereto, of the joint fixation base respectively.

20. The foldable baby stroller of claim 16, wherein:
the rear end of the upper-front fence tube and the front end of the upper-back fence tube extend into a front end and a rear end of the upper-end positioning slot respectively; and
the rear end of the lower-front fence tube and the front end of the lower-back fence tube extend into a front end and a rear end of the lower-end positioning slot respectively.

* * * * *